United States Patent
Shipp

(10) Patent No.: US 7,496,963 B2
(45) Date of Patent: Feb. 24, 2009

(54) METHOD OF, AND SYSTEM FOR, HEURISTICALLY DETECTING VIRUSES IN EXECUTABLE CODE

(75) Inventor: Alexander Shipp, Gloucester (GB)

(73) Assignee: Messagelabs Limited, Gloucester (GB)

( * ) Notice: Subject to any disclaimer, the term of this patent is extended or adjusted under 35 U.S.C. 154(b) by 651 days.

(21) Appl. No.: 10/500,955

(22) PCT Filed: Aug. 11, 2003

(86) PCT No.: PCT/GB03/03476

§ 371 (c)(1),
(2), (4) Date: Sep. 3, 2004

(87) PCT Pub. No.: WO2004/017183

PCT Pub. Date: Feb. 26, 2004

(65) Prior Publication Data

US 2005/0039029 A1 Feb. 17, 2005

(30) Foreign Application Priority Data

Aug. 14, 2002 (GB) .................................. 0218993.4

(51) Int. Cl.
*G06F 12/14* (2006.01)
(52) U.S. Cl. .......................... 726/24; 713/187; 713/188
(58) Field of Classification Search .................. 726/24; 713/188, 187; 706/12
See application file for complete search history.

(56) References Cited

U.S. PATENT DOCUMENTS 5,440,723 A * 8/1995 Arnold et al. ................... 714/2
5,675,711 A * 10/1997 Kephart et al. ................ 706/12
6,016,546 A * 1/2000 Kephart et al. ................ 726/24
6,357,008 B1 * 3/2002 Nachenberg .................. 726/24
6,971,019 B1 * 11/2005 Nachenberg ................ 713/188

FOREIGN PATENT DOCUMENTS

WO 02/33525 A2 4/2002

OTHER PUBLICATIONS

Nachenberg; "A New Technique For Technique For Detecting Polymorphic Computer Viruses. A Thesis Submitted in Partial Satisfaction of the Requirements for the Degree Master of Science in Computer Science and Engineering"; Thesis University of California, XX, XX, 1995, pp. I-V, 1-127, XP000197628.
IBM Technical Disclosure Bulletin, Apr. 1990, "System for Detecting Undesired Alteration of Software".
Elsevier, Computers and Security, vol. 15, No. 7, 1996, Bontchev; "Possible Macro Virus Attacks and how to Prevent Them"; pp. 595-626, see section 2.2.1.
"Proceedings of the second international virus bulletin conference", Sep. 2-3; 1992, pp. 1-14, Hruska; "Virus Structure"; see section1.1 and figure 5.

* cited by examiner

*Primary Examiner*—Andrew L Nalven
(74) *Attorney, Agent, or Firm*—Nixon & Vanderhye, PC

(57) ABSTRACT

A method of, and system for, virus detection has a database of known patterns of start-up code for executable images created using a collection of known compilers and uses examination of the start-up code of the image by reference to this database to determine whether or not the executable image is likely to have been subject to infection by viral code. In particular, the system seeks to determine whether the expected flow and execution of the image during start up has had viral code interjected into it. Various heuristics to assist in assessing the likely presence of viral code are disclosed.

12 Claims, 3 Drawing Sheets

EXAMPLE OF VIRUS CHANGING PROGRAM ENTRY POINT

EXAMPLE OF VIRUS CHANGING PROGRAM ENTRY POINT

EXAMPLE OF VIRUS OVERWRITING CODE AT PROGRAM ENTRY POINT

UNINFECTED FILE

EXAMPLE OF VIRUS OVERWRITING CODE AT PROGRAM ENTRY POINT

INFECTED FILE

METHOD OF, AND SYSTEM FOR, HEURISTICALLY DETECTING VIRUSES IN EXECUTABLE CODE

This application is the U.S. national phase of international application PCT/GB03/03476, filed 11 Aug. 2003, which designated the U.S. and claims priority to GB Application No. 0218993.4, filed 14 Aug. 2002. The entire contents of these applications are incorporated herein by reference.

BACKGROUND AND SUMMARY

The present invention relates to a method of, and system for, heuristically detecting viruses in executable code by searching the code for known startup sequences.

A common form of computer virus infection is where the virus's executable code is attached to, or embedded in, a program or other computer file containing executable code which appears, on the face of it, to be benign. One well-established method of virus propagation is where the virus, once activated on a host machine such as a user's PC, will attach itself to one or more programs found on the host in such a way that that program, once run, will execute the virus's code giving it the opportunity to propagate again and/or to undertake whatever other malignant behaviours (such as destruction of files, etc.) have been programmed into it. This method of propagation does, of course, provide an opportunity to detect the virus, for example by associating checksums with program files and detecting when this checksum changes. That is of course only one of the many strategies which have been devised to detect viruses.

Another well-known method of detecting viruses, implemented in many of the anti-virus software packages which are available, involves scanning program and other files for certain characteristic sequences of bytes (known as signatures) which indicate the likely presence of a virus. One of the practical problems with signature-based detection is that it requires some skill and a significant amount of time, when a new virus is first detected, to establish a suitable characteristic signature of it. This signature needs to be one which does not produce too many false positives and which does not misidentify the virus, for example as an existing one with a more benign payload. This signature information then needs to be disseminated to sites which use the anti-virus package in question before it can be used there to detect the newly-identified virus. In recent years, many of the notable virus outbreaks have involved viruses which propagate over the internet and it takes time for publishers of anti-virus software to react when a virus outbreak occurs.

Some internet service providers offer anti-virus scanning of internet traffic passing through their internet nodes as a value-added service.

The present invention relates to a method of virus detection which is intended to be useful for ISPs performing anti-virus scanning, e.g. of executables such as program files attached to emails, though it is by no means limited to that application and may be used in any anti-virus package.

According to the present invention there is provided a method of detecting virus infection of an executable image comprising:

identifying by reference to a database of known executable image layouts, the layouts to which the executable image conforms;

identifying start-up code within the executable image by reference to the identified image layout; and examining the start-up code with reference to a database of start-up code characteristics to determine whether the image is likely to have been subject to viral modification.

The invention also provides a system for detecting virus infection of an executable image comprising:

means for identifying, by reference to a database of known executable image layouts, to which one of those layouts the executable image conforms;

means for identifying start-up code within the executable image by reference to the identified image layout; and means for examining the start-up code with reference to a database of start-up code characteristics to determine whether the image is likely to have been subject to viral modification.

BRIEF DESCRIPTION OF THE DRAWINGS

The invention will be further described by way of non-limiting example with reference to the accompanying drawings, in which:—

DETAILED DESCRIPTION OF EXAMPLE EMBODIMENTS

Figure 1A:
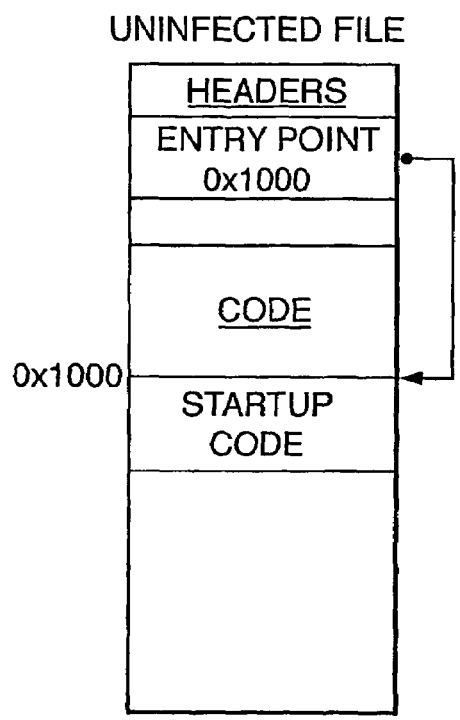
FIGS. 1a and 1b show an example of a virus changing the program entry point.

Before proceeding with the description of the illustrated embodiment of the invention, some terms will be explained.

MD5 (message digest 5) checksum. MD5 is a one-way hashing algorithm—it generates a large number (the MD5 checksum) after analysing a byte stream—such as a file. The chances of two files generating the same large number are very small. It is also very difficult to create a file which will generate any particular MD5 checksum.

False positive: A false positive occurs when an anti-virus product identifies a particular file as being malware, whereas in fact it is not.

Regular expression: Regular expressions are strings which can be used to express patterns for pattern matching purposes. For instance, the perl regular expression /^hello [0-9]+/ matches any string starting with the letters 'hello', then a space, then one or more digits. Some languages such as perl have native support for regular expressions; for others, libraries are available which implement regular expression matching.

Compiler: According to strict usage, a compiler generates one or more object modules from program source code. These object modules are typically not executable programs per se but require an additional step of linking by a linker. The action of a linker is typically to generate an image of an executable by linking together the object module(s), and external binary libraries which the module(s) reference; the production of the image may involve the pre-pending of a header region according to an executable file layout of a target operating system as well as the addition of resources such as bitmaps and the like. The term "compiler" as used herein is intended to include a linker, if required from a technical standpoint. What the compiler produces is not necessarily a stand-alone program, of course: compilers also produce executables such as dynamic link libraries and device drivers.

Program image: A program image is a sequence of bytes of executable code, which may exist on disk, in memory or in a network socket stream. In its on-disk form the image may be part of a program file which also includes a program header containing the information normally found in such programs.

To gain control, a virus must insert itself into the execution path of program code. Although, theoretically, the virus can insert itself anywhere in a program, if it inserts itself into the middle then this lessens the chance of it gaining control, since the place it inserts itself into may be executed rarely or never. Therefore, many viruses replace the startup code of programs with their own startup code. This guarantees they will be executed, giving them a better chance of survival. The on-disk image of an executable program must conform to a layout appropriate to the operating system and any given operating system may support a number of said layouts. At the time of writing the majority of Microsoft Windows™ programs conform to the "Windows PE" layout. These layouts, as exemplified in FIG. 1, usually begin with a header containing e.g. checksum and relocation tables for segment fix-ups which are carried out by the operating system's (OS) loader as it loads the program. At some point the OS will hand over control to the program by a call to the program's entry point, which is indicated in the program header.

What happens after that depends on the nature of the program and on the compiler and linker which have been used to create it. Fully compiled, user-runnable, programs generally have a runtime library link which handles a number of common tasks. In particular, the runtime library usually contains routines which are involved at start-up and perform tasks such as setting up in-memory structures such as the program stack and heap. The program code written by the program's author generally assumes that these actions will have been performed by start-up code in the runtime library before the author's code begins to execute. All this is not to say that for a given compiler and linker and runtime library, the start-up code of a program created using them will be completely invariant, but rather that different programs compiled with the same compiler and linker and runtime library exhibit sufficient similarity, at least in terms of code found via the program entry point, to provide the basis for determining whether viral code has been patched into the program after it was compiled and linked.

Figure 1B:
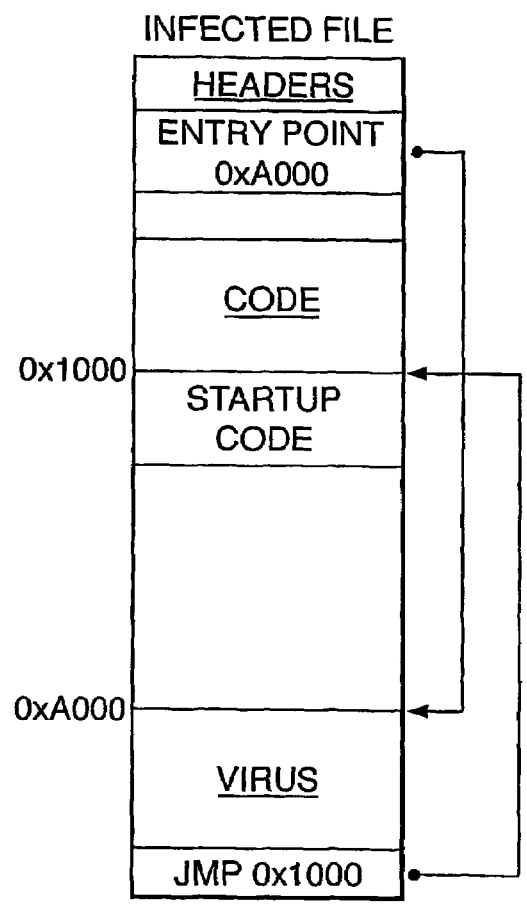
Figure 2A:
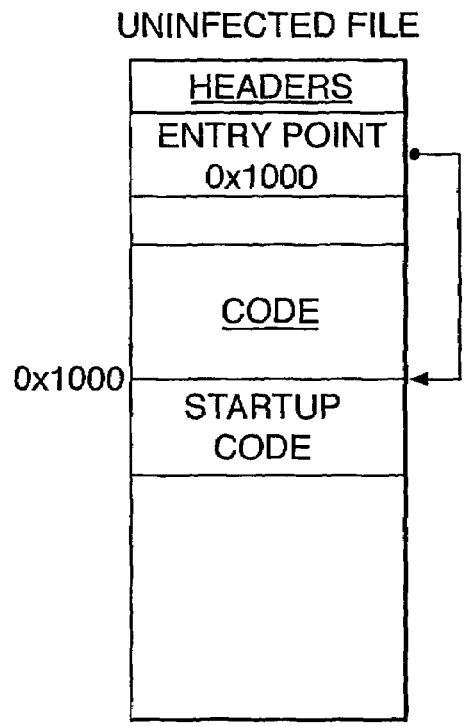
FIGS. 2a and 2b show an example of a virus overwriting code at the program entry point.
Figure 2B:
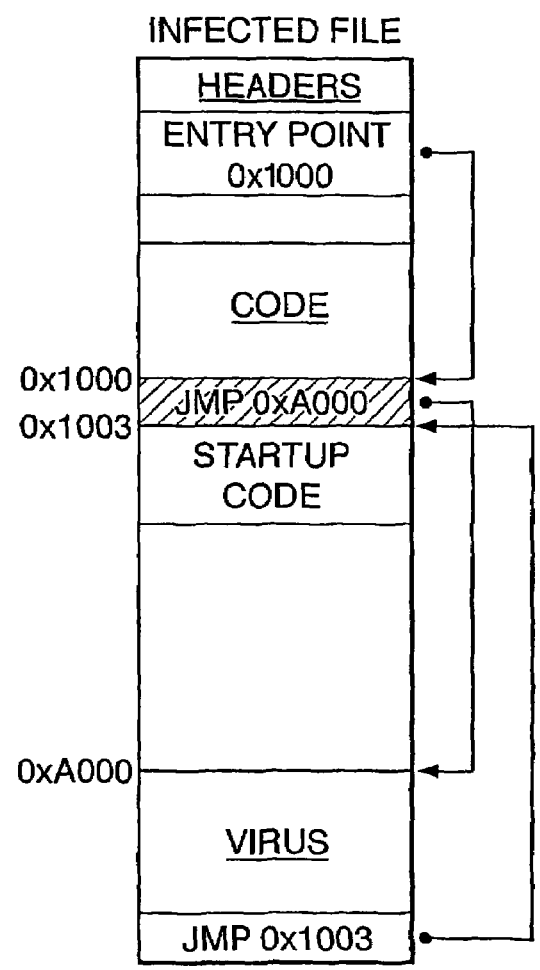

To gain control at startup, a virus can change the program start point to point to the virus start code, or it can change part of the actual startup code, replacing it with a jump or call to its own code. FIG. 1 shows an example of a virus changing the program start point to point to its own code. FIG. 2 shows an example of a virus changing the startup code, replacing it with a jump to its own code.

As mentioned above, often a particular compiler and set of libraries will generate the same startup code for all, or a large proportion of programs it generates. Sometimes, this is because it starts with a standard library sequence that performs common tasks necessary during startup. Sometimes this is because the compiler generates applications in a particular way (eg Visual BASIC).

If it can be identified that a particular program contains the common startup code, but that the program does not actually start with this code, then this is very suspicious, and the program can be flagged as potentially containing a virus. This would be the case with the example in FIG. 1.

If it can be identified that a particular program starts with code similar to the common startup code, but that the beginning of this code has been changed, then this is very suspicious, and the program can be flagged as potentially containing a virus. This would be the case with the example in FIG. 2.

The operation of the present embodiment proceeds by examination of an image of a program, be it on disk, in memory, or part of a network packet stream, with reference to a database of characteristics of programs created using known compilers and a pattern matcher to determine whether the program image, in particular the start-up code deviates from what would be expected from that compiler in a way which makes the program suspicious.

Figure 3:
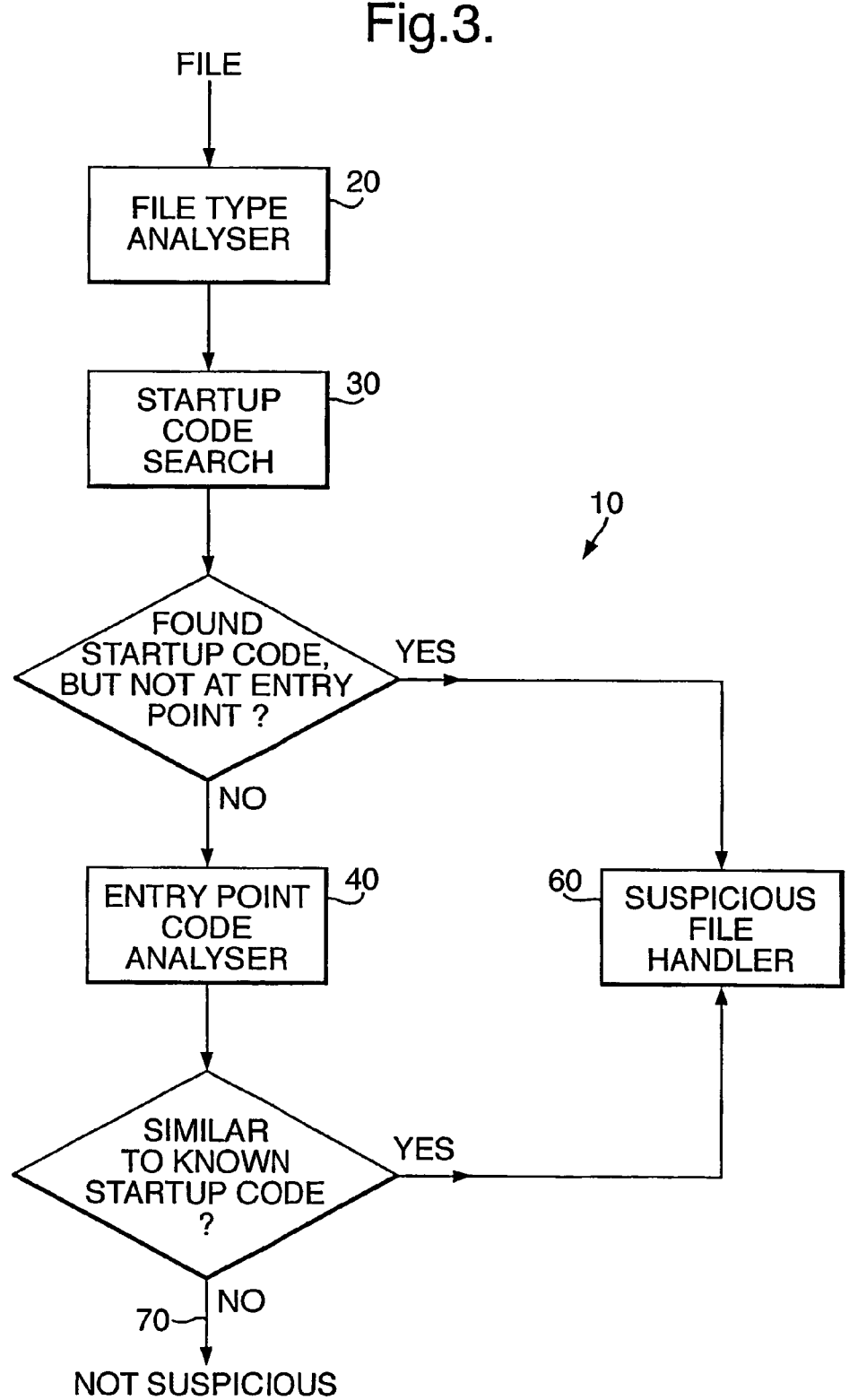
FIG. 3 shows a system according to the present invention.

FIG. 3 shows one embodiment of the invention. For the purposes of illustration, it may be assumed that files to be scanned are delivered from an input queue and each one is processed by the system 10 shown in FIG. 3.

1) By analysing the suspicious image using a file-type analyser 20, the type can be determined. For instance, it may be non-program, or program. Non-programs are not analysed further. Programs are further classified depending on their type—for instance, DOS, Windows PE, Windows NE, Linux ELF, Macintosh, etc. This analysis is done by file-type analyser 20. Note that in the case of a file image, the file type (e.g. .EXE, .DLL, etc.) should be disregarded.

2) Depending on the type of program, this can then be searched by start up code search 30 for appropriate start-up code against a database of start-up code sequences. For instance, Windows PE files may be searched for startup code created by the Microsoft Visual Studio C compiler, Borland C compilers, the Microsoft Visual BASIC compiler and the Delphi compiler.

3) If the startup code search 30 determines that start-up code is found, but the program does not actually start with this code, then it hands to the suspicious file handler (step 6).

4) If entry point code analyser 40 determines that the program starts with code similar to known startup code, then go to the exception list step (6) which is handled by the suspicious file handler 60.

5) If execution arrives at the exit point 70 the program is flagged 'not suspicious' and no further action is taken.

6) The suspicious file handler 60 may make use of an exception list to prevent false positives. For instance, there may be genuine program files which appear to contain startup code, but do not, programs which contain recognised startup code but not at the entry point and programs which for some reason contain the startup code but start with some other code. These genuine files can be included in the exception list. The exception list can work in various ways, including but not limited to comparing the MD5 checksum of a file with a list of known checksums, or by searching the files for regular expressions, or by comparing the actual startup code with a list of known exception startup codes. If any exception list match occurs, no further action is taken.

A further consideration for which the suspicious file handler may be programmed to take account is that utility programs exist which "repackage" program files in certain ways. One such type of utility is the compression utility exemplified by Blinker (www.blink.com) which compresses an executable and adds a stub loader so that when the program is run, the stub loader is invoked and decompresses the executable's image. In most cases, the compression utility will compress the original executable's startup code which will not therefore be found by pattern matching for startup code. However, supposing for some reason a particular startup code sequence was uncompressible, and therefore remained unaltered. This could then generate a false positive. To avoid this, an exception list entry could be created which would, in effect, say "Ignore all programs packed by Blinker". There are various ways to do this for the different utilities which exist, including detecting the startup code of their own which they insert in the executable image and also checking the section characteristics (such as name, sequence, flags) in layouts such as a PE file.

7) Otherwise, the program is flagged as possibly containing a virus. This may be used as an absolute decision, or combined with other heuristics to make an overall decision as to whether the program is viral or not.

Programs which are stopped as viral, but which do not turn out to be viral, can be analysed, and an exception list entry generated, so that similar false positives do not occur in future.

As well as using this as a stand-alone virus detection algorithm, this can be combined with other techniques as part of a larger system. For instance, programs flagged as viral by this method may be allocated a certain score, or variety of scores depending on the exact circumstances. Scores may also be assigned using other heuristic techniques, and only if the total score passes some limit is the program flagged as viral.

Once flagged as viral, any suitable remedial action may be taken, either by the system acting autonomously e.g. by moving the program file to a quarantine directory, or by signalling a human operator that intervention is required.

Example of Examining a Suspicious File

Following is a simplistic example of an algorithm for determining if a file is likely to be a Windows PE file, which may be implemented by the file type analyser 20.

Read in first 2 bytes. If these are not 'MZ' then stop

Read in another 58 bytes.

Read in 4 bytes into variable x (treating using intel byte-ordering)

Seek to offset x in file

Read in 4 bytes

If bytes are P E \0 \0, then file is likely to be a Windows PE file

Example of Searching File For Known Startup Code

The following is a common startup sequence for programs generated for the Microsoft Development Studio C compiler for the windows environment.

| Hex bytes in file | | | | | | | | | Human-readable disassembly | |
|---|---|---|---|---|---|---|---|---|---|---|
| 55 | | | | | | | | | push | ebp |
| 8B | EC | | | | | | | | mov | ebp, esp |
| 6A | FF | | | | | | | | push | 0FFFFFFFFh |
| 68 | 10 | 11 | 00 | 01 | | | | | push | offset var1 |
| 68 | 80 | 22 | 00 | 01 | | | | | push | offset loc__1002280 |
| 64 | A1 | 00 | 00 | 00 | 00 | | | | mov | eax, large fs:0 |
| 50 | | | | | | | | | push | eax |
| 64 | 89 | 25 | 00 | 00 | 00 | 00 | | | mov | large fs:0, esp |
| 83 | C4 | E0 | | | | | | | add | esp, 0FFFFFFE0h |
| 53 | | | | | | | | | push | ebx |
| 56 | | | | | | | | | push | esi |
| 57 | | | | | | | | | push | edi |
| 89 | 65 | E8 | | | | | | | mov | [ebp+var__18], esp |
| C7 | 45 | FC | 00 | 00 | 00 | 00 | | | mov | [ebp+var__4], 0 |
| 6A | 01 | | | | | | | | push | 1 |
| FF | 15 | 40 | 10 | 00 | 01 | | | | call | ds:__set_app_type |
| 83 | C4 | 04 | | | | | | | add | esp, 4 |
| C7 | 05 | B0 | 32 | 00 | 01 | FF | FF | FF | FF | mov | dword__10032B0, 0FFFFFFFFh |
| C7 | 05 | B4 | 32 | 00 | 01 | FF | FF | FF | FF | mov | dword__10032B4, 0FFFFFFFFh |
| FF | 15 | 4C | 10 | 00 | 01 | | | | call | ds:__p__fmode |
| 8B | 0D | D0 | 30 | 00 | 01 | | | | mov | ecx, dword__10030D0 |
| 89 | 08 | | | | | | | | mov | [eax], ecx |
| FF | 15 | 68 | 10 | 00 | 01 | | | | call | ds:__p__commode |
| 8B | 15 | CC | 30 | 00 | 01 | | | | mov | edx, dword__10030CC |
| 89 | 10 | | | | | | | | mov | [eax], edx |
| A1 | 64 | 10 | 00 | 01 | | | | | mov | eax, ds:__adjust__fdiv |
| 8B | 08 | | | | | | | | mov | ecx, [eax] |
| 89 | 0D | B8 | 32 | 00 | 01 | | | | mov | dword__10032B8, ecx |
| E8 | 16 | 01 | 00 | 00 | | | | | call | unknown__libname__2 |
| A1 | AC | 30 | 00 | 01 | | | | | mov | eax, dword__10030AC |
| 85 | C0 | | | | | | | | test | eax, eax |
| 75 | 0E | | | | | | | | jnz | short loc__1002171 |
| 68 | 60 | 22 | 00 | 01 | | | | | push | offset unknown__libname__1 |
| FF | 15 | 60 | 10 | 00 | 01 | | | | call | ds:__setusermatherr |
| 83 | C4 | 04 | | | | | | | add | esp, 4 |
| E8 | CA | 00 | 00 | 00 | | | | | call | __setdefaultprecision |
| 68 | 0C | 30 | 00 | 01 | | | | | push | offset unk__100300C |
| 68 | 08 | 30 | 00 | 01 | | | | | push | offset unk__1003008 |
| E8 | B1 | 00 | 00 | 00 | | | | | call | __initterm |
| 83 | C4 | 08 | | | | | | | add | esp, 8 |
| 8B | 15 | C8 | 30 | 00 | 01 | | | | mov | edx, dword__10030C8 |
| 89 | 55 | D8 | | | | | | | mov | [ebp+var__28], edx |
| 8D | 45 | D8 | | | | | | | lea | eax, [ebp+var__28] |
| 50 | | | | | | | | | push | eax |
| 8B | 0D | C4 | 30 | 00 | 01 | | | | mov | ecx, dword__10030C4 |
| 51 | | | | | | | | | push | ecx |
| 8D | 55 | E0 | | | | | | | lea | edx, [ebp+envp] |
| 52 | | | | | | | | | push | edx |
| 8D | 45 | D4 | | | | | | | lea | eax, [ebp+argv] |
| 50 | | | | | | | | | push | eax |
| 8D | 4D | E4 | | | | | | | lea | ecx, [ebp+argc] |
| 51 | | | | | | | | | push | ecx |
| FF | 15 | 58 | 10 | 00 | 01 | | | | call | ds:__getmainargs |

-continued

| Hex bytes in file | | | | | | Human-readable disassembly | |
|---|---|---|---|---|---|---|---|
| 83 | C4 | 14 | | | | add | esp, 14h |
| 68 | 04 | 30 | 00 | 01 | | push | offset unk__1003004 |
| 68 | 00 | 30 | 00 | 01 | | push | offset unk__1003000 |
| E8 | 76 | 00 | 00 | 00 | | call | __initterm |
| 83 | C4 | 08 | | | | add | esp, 8 |
| FF | 15 | 30 | 10 | 00 | 01 | call | ds:__p__initenv |
| 8B | 55 | E0 | | | | mov | edx, [ebp+envp] |
| 89 | 10 | | | | | mov | [eax], edx |
| 8B | 45 | E0 | | | | mov | eax, [ebp+envp] |
| 50 | | | | | | push | eax |
| 8B | 4D | D4 | | | | mov | ecx, [ebp+argv] |
| 51 | | | | | | push | ecx |
| 8B | 55 | E4 | | | | mov | edx, [ebp+argc] |
| 52 | | | | | | push | edx |
| E8 | 40 | F5 | FF | FF | | call | __main |
| 83 | C4 | 0C | | | | add | esp, 0Ch |
| 89 | 45 | DC | | | | mov | [ebp+var__24], eax |
| 50 | | | | | | push | eax |
| FF | 15 | 48 | 10 | 00 | 01 | call | ds:exit |
| EB | 22 | | | | | jmp | short loc__1002210 |
| 8B | 45 | EC | | | | mov | eax, [ebp-14h] |
| 8B | 08 | | | | | mov | ecx, [eax] |
| 8B | 09 | | | | | mov | ecx, [ecx] |
| 89 | 4D | D0 | | | | mov | [ebp-30h], ecx |
| 50 | | | | | | push | eax |
| 51 | | | | | | push | ecx |
| E8 | 31 | 00 | 00 | 00 | | call | __XcptFilter |
| 83 | C4 | 08 | | | | add | esp, 8 |
| C3 | | | | | | retn | |
| 8B | 65 | E8 | | | | mov | esp, [ebp-18h] |
| 8B | 55 | D0 | | | | mov | edx, [ebp-30h] |
| 52 | | | | | | push | edx |
| FF | 15 | 50 | 10 | 00 | 01 | call | ds:__exit |
| 83 | C4 | 04 | | | | add | esp, 4 |
| C7 | 45 | FC | FF | FF | FF | FF | mov | [ebp+var__4], 0FFFFFFFFh |
| 8B | 4D | F0 | | | | mov | ecx, [ebp+var__10] |
| 64 | 89 | 0D | 00 | 00 | 00 | 00 | mov | large fs:0, ecx |
| 5F | | | | | | pop | edi |
| 5E | | | | | | pop | esi |
| 5B | | | | | | pop | ebx |
| 8B | E5 | | | | | mov | esp, ebp |
| 5D | | | | | | pop | ebp |
| C3 | | | | | | retn | |

However, we cannot simply search for this particular byte pattern (55, 8B, EC, 6A, FF, 68, 10, 11, 00, 01, etc); many of the values are offsets to other routines or data structures, which will vary from program to program because they will be located in different places, and therefore have different offsets. For instance, the fourth instruction, push offset var1, has the byte sequence 68 10 11 00 01 in the example, because the variable var1 is located at offset 0x01001110 in this program. In another program, var1 may be located at a different offset (say 0x10011EF), and the fourth instruction will then have the byte sequence 60 EF 11 00 01.

A simplistic search could therefore match those bytes that are constant, and skip over the bytes that vary. For every byte in the program file, we attempt to see if the search pattern fits, and if it does we have found the code. If it does not, we carry on with the next byte in the file and so on until the end of the file is reached.

Match 1 byte: 55
Match 2 bytes: 8B, EC
Match 2 bytes: 6A, FF
Match 1 byte: 68
Skip the next 4 bytes
Match one byte: 68
Skip the next 4 bytes
. . . and so on until
Match 2 bytes 8B, E5
Match 1 byte 5D
Match 1 byte C3

A more detailed search could perform other checks on the bytes that vary. For instance, if the bytes are known from knowledge of the start-up code which the compiler generates to be an offset to a data structure containing a value such as 'Press any key to continue', the search could check that this offset actually contains this data. If they are an offset to a known routine, the search could recursively check that the known routine matches a correct pattern.

For instance, suppose that in the original pattern, that var1 contains the string 'hello'. The search algorithm might now be:

Match 1 byte: 55
Match 2 bytes: 8B, EC
Match 2 bytes: 6A, FF
Match 1 byte: 68
Read the next 4 bytes into variable offsetcheck1
Match one byte: 68
Skip the next 4 bytes
. . . and so on until
Match 2 bytes 8B, E5
Match 1 byte 5D
Match 1 byte C3

Then:
Move to the location held in offsetcheck1 (in our example, this would be 0x01001110).
Match the next 5 bytes: 'hello'
If we find this startup code pattern, we then check if it is located at the entry point of the program. If it is, then all is OK. If not, then this is flagged as suspect (startup code found, but program does not start with this code).

Example of Searching File For Changed Startup Code

Using the same example startup code as before, we could use the following algorithm to determine if the file contained changed startup code:

Go to offset of program start.
Skip 15 bytes
Match 6 bytes: 64, A1, 00, 00, 00, 00
Match 1 byte: 50
Match 7 bytes: 64 89 25 00 00 00 00
. . . and so on until
Match 2 bytes 8B, E5
Match 1 byte 5D
Match 1 byte C3
If code did not match, stop search.

If code does match, then the bytes from offset 15 onwards are part of a known startup sequence. If the first 15 bytes also match this startup sequence, all is OK. Otherwise this is potentially interesting. The checks therefore continue as follows.

Go to offset program start
Match 1 byte: 55
Match 2 bytes: 8B, EC
Match 2 bytes: 6A, FF
Match 1 byte: 68
Skip the next 4 bytes
Match one byte: 68
Skip the next 4 bytes If all matches succeeded, then this is part of a known startup sequence. Otherwise, this is flagged as 'changed startup code'.

I claim:

1. A method of detecting virus infection of an executable image, the method comprising:

determining a file type and an entry point of the executable image;

scanning the executable image, with reference to a database of start-up code characteristics including patterns characteristic of start-up code generated by known compilers used to create respective file types, for start-up code at a location other than said entry point generated by one of the compilers used to generate the determined file type; and flagging the executable image as suspicious from the point of view of possibly containing a virus infection in response to determining during the scanning that the executable image contains said start-up code at a location other than said entry point.

2. A method according to claim 1, wherein the database of start-up code characteristics includes records of data values associated with routines which form part of the start up code, and the step of scanning the executable image for start-up code comprises identifying the data in the executable image corresponding to at least one such data value and comparing it with that value.

3. A method according to claim 1, further comprising:

performing remedial action in respect of executable images flagged as suspicious from the point of view of possibly containing a virus infection.

4. A method of detecting virus infection of an executable image, the method comprising:

determining a file type and an entry point of the executable image;

determining, with reference to a database of start-up code characteristics including patterns characteristic of start-up code generated by known compilers used to create respective file types, whether the executable image has at said entry point code similar to start-up code generated by one of the compilers used to generate the determined file type but with the beginning of this code having been changed; and flagging the executable image as suspicious from the point of view of possibly containing a virus infection in response to determining that the executable image has said code at said entry point.

5. A method according to claim 4, wherein the database of start-up code characteristics includes records of data values associated with routines which form part of the start-up code, and the step of determining whether the executable image has at said entry point code similar to start-up code generated by one of the compilers used to generate the determined file type but with the beginning of this code having been changed comprises identifying the data in the executable image corresponding to at least one such data value and comparing it with that value.

6. A method according to claim 4, further comprising:

performing remedial action in respect of executable images flagged as suspicious from the point of view of possibly containing a virus infection.

7. A system implemented on a computer apparatus for detecting virus infection of an executable image, the system comprising:

a file-type analyzer operative to determine a file type and an entry point of the executable image; and a start-up code searcher operative to scan the executable image, with reference to a database of start-up code characteristics including patterns characteristic of start-up code generated by known compilers used to create respective file types, for start-up code at a location other than said entry point generated by one of the compilers used to generate the determined file type, the system being operative to flag the executable image as suspicious from the point of view of possibly containing a virus infection in response to the start-up code searcher determining that the executable image contains said start-up code at a location other than said entry point.

8. A system according to claim 7, wherein the database of start-up code characteristics includes records of data values associated with routines which form part of the start-up code, and the start-up code searcher is operative to identify the data in the executable image corresponding to at least one such data value and comparing it with that value.

9. A system according to claim 7, wherein the system is operative to perform remedial action in respect of executable images flagged as suspicious from the point of view of possibly containing a virus infection.

10. A system implemented on a computer apparatus for detecting virus infection of an executable image, the system comprising:

a file-type analyzer operative to determine a file type and an entry point of the executable image; and an entry point code analyzer operative to determine, with reference to a database of start-up code characteristics including patterns characteristic of start-up code generated by known compilers used to create respective file types, whether the executable image has at said entry point code similar to start-up code generated by one of the compilers used to generate the determined file type but with the beginning of this code having been changed, the system being operative to flag the executable image as suspicious from the point of view of possibly containing a virus infection in response to determining that the executable image has said code at said entry point.

11. A system according to claim 10, wherein the database of start-up code characteristics includes records of data values associated with routines which form part of the start-up code, and the entry point code analyzer is operative to determine whether the executable image has at said entry point code similar to start-up code generated by one of the compilers used to generate the determined file type but with the beginning of this code having been changed is arranged to identify the data in the executable image corresponding to at least one such data value and comparing it with that value.

12. A system according to claim 10, wherein the system is operative to perform remedial action in respect of executable images flagged as suspicious from the point of view of possibly containing a virus infection.

* * * * *